US011643287B2

(12) United States Patent
Dawson et al.

(10) Patent No.: US 11,643,287 B2
(45) Date of Patent: May 9, 2023

(54) SYSTEMS AND METHODS FOR CONVEYING A NON-DRY FRAC PROPPANT

(71) Applicant: Walker-Dawson Interests, Inc., Prairieville, LA (US)

(72) Inventors: Richard F. Dawson, Clinton, LA (US); William J. Walker, Prairieville, LA (US); Robert D. Harper, Prairieville, LA (US)

(73) Assignee: Walker-Dawson Interests, Inc., Prairieville, LA (US)

( * ) Notice: Subject to any disclaimer, the term of this patent is extended or adjusted under 35 U.S.C. 154(b) by 1076 days.

(21) Appl. No.: 16/190,315

(22) Filed: Nov. 14, 2018

(65) Prior Publication Data

US 2019/0144216 A1 May 16, 2019

Related U.S. Application Data

(60) Provisional application No. 62/585,766, filed on Nov. 14, 2017.

(51) Int. Cl.
 *B65G 65/42* (2006.01)
 *B65G 65/00* (2006.01)
 (Continued)

(52) U.S. Cl.
 CPC ........... *B65G 65/005* (2013.01); *B65G 43/08* (2013.01); *B65G 65/40* (2013.01); *E21B 21/062* (2013.01); *B65G 65/42* (2013.01); *E21B 43/267* (2013.01)

(58) Field of Classification Search
 CPC .................................................. B65G 65/425
 (Continued)

(56) References Cited

U.S. PATENT DOCUMENTS 3,897,868 A * 8/1975 Smith, Jr. ............ G01G 11/083
 198/572
6,619,889 B1 * 9/2003 Sinker ................ B01D 21/0021
 406/122

(Continued)

FOREIGN PATENT DOCUMENTS

CN 106566524 A 4/2017

OTHER PUBLICATIONS

Jacobs, Trent; "How Wet-Sand Completions Became Key to Chesapeake's Low-Cost Future"; Apr. 1, 2021; Journal of Petroleum Technology; 9 pages.

*Primary Examiner* — Joseph A Dillon, Jr.
(74) *Attorney, Agent, or Firm* — Phelps Dunbar, LLP; R. Andrew Patty, II (57) ABSTRACT

Systems and methods for conveying non-dry frac proppant are described herein. The system generally includes at least one hopper having at least one moisture sensor, a slide gate that is fluidly connected to the at least one hopper, a conveyor assembly having at least one conveyor belt configured to convey the non-dry frac proppant from the at least one hopper to a blender, and at least one load sensor, and a control device configured to regulate a discharge rate of the non-dry frac proppant and a load rate of the non-dry frac proppant. The method generally includes providing the system at a well site to convey a non-dry frac proppant from a source point the at least one hopper, the conveyor assembly at a discharge rate determined by the control device, and the blender at a load rate determined by the control device.

11 Claims, 6 Drawing Sheets

(51) Int. Cl.
*B65G 43/08* (2006.01)
*B65G 65/40* (2006.01)
*E21B 21/06* (2006.01)
*E21B 43/267* (2006.01)

(58) Field of Classification Search
USPC .......................................................... 414/332
See application file for complete search history.

(56) References Cited

U.S. PATENT DOCUMENTS

| | | | |
|---|---|---|---|
| 8,022,019 B2 | 9/2011 | Rush et al. | |
| 8,235,313 B2 | 8/2012 | Ziegler | |
| 8,585,341 B1 * | 11/2013 | Oren | B65D 90/58 414/407 |
| 8,668,430 B2 * | 3/2014 | Oren | B65D 88/28 414/414 |
| 8,915,691 B2 * | 12/2014 | Mintz | B65D 88/54 406/28 |
| 9,051,801 B1 * | 6/2015 | Mintz | B65D 88/30 |
| 9,086,164 B2 * | 7/2015 | Mortzheim | E21B 21/062 |
| 9,133,701 B2 * | 9/2015 | Luharuka | E21B 43/267 |
| 9,296,518 B2 | 3/2016 | Oren | |
| 9,403,626 B2 | 8/2016 | Oren | |
| 9,481,824 B2 | 11/2016 | Ayers | |
| 9,511,929 B2 | 12/2016 | Oren | |
| 9,845,210 B2 * | 12/2017 | Oren | B65G 15/00 |
| 9,868,598 B2 * | 1/2018 | Oren | B65G 53/24 |
| 9,902,576 B1 * | 2/2018 | Oren | B01F 33/5021 |
| 9,919,882 B2 * | 3/2018 | Oren | E21B 41/00 |
| 9,932,183 B2 * | 4/2018 | Oren | E21B 41/00 |
| 9,963,308 B2 * | 5/2018 | Oren | B65G 65/42 |
| 9,969,553 B2 * | 5/2018 | Westover | B65G 11/186 |
| 10,035,668 B2 * | 7/2018 | Oren | B65G 69/182 |
| 10,065,812 B2 * | 9/2018 | Pham | B65D 88/54 |
| 10,065,816 B2 * | 9/2018 | Oren | B01F 33/5021 |
| 10,076,733 B2 | 9/2018 | Morris et al. | |
| 10,202,835 B2 * | 2/2019 | Hayworth | B65G 53/04 |
| 10,399,789 B2 * | 9/2019 | Glynn | E21B 21/02 |
| 10,479,255 B2 * | 11/2019 | Krenek | B65D 88/12 |
| 10,518,229 B2 | 12/2019 | Morris et al. | |
| 10,625,654 B2 * | 4/2020 | Hughes | B65D 88/30 |
| 10,654,667 B2 * | 5/2020 | Orban | B65G 65/425 |
| 10,676,296 B2 * | 6/2020 | Oren | B65G 69/181 |
| 10,906,747 B2 * | 2/2021 | Aga | G01G 11/083 |
| 10,926,967 B2 * | 2/2021 | Oren | B65G 53/26 |
| 10,982,505 B2 * | 4/2021 | Oehler | B65G 27/16 |
| 10,989,018 B2 | 4/2021 | Oehler et al. | |
| 11,280,158 B2 * | 3/2022 | Oehler | B65G 27/16 |
| 11,320,079 B2 * | 5/2022 | Kuhn De Chizelle | G05D 16/2066 |
| 2003/0164235 A1 | 9/2003 | Leeson et al. | |
| 2016/0101428 A1 | 4/2016 | Convery et al. | |
| 2018/0148269 A1 * | 5/2018 | Oren | B65G 69/185 |
| 2020/0199990 A1 * | 6/2020 | Friesen | B01F 35/71705 |
| 2021/0404303 A1 * | 12/2021 | Hindman | B65G 65/42 |
| 2022/0162925 A1 * | 5/2022 | Oehler | B65G 69/08 |

\* cited by examiner

SYSTEMS AND METHODS FOR CONVEYING A NON-DRY FRAC PROPPANT

CROSS-REFERENCE TO RELATED APPLICATIONS

This application claims the benefit of U.S. Provisional Application No. 62/585,766, filed Nov. 14, 2017.

TECHNICAL FIELD

The present disclosure relates to systems and methods for conveying, storing and distributing a non-dry frac proppant from a source point to a well site. More specifically, the present disclosure relates systems and methods for conveying, storing and distributing non-dry frac sand from a source point to a well site for use in drilling operations such as in hydraulic fracturing of a subterranean geological formation.

BACKGROUND

This section introduces information that may be related to or provide context for some aspects of the compositions or methods described herein and/or claimed below. This information is background for facilitating a better understanding of that which is disclosed herein. Such background may include a discussion of "related" art. That such art is related in no way implies that it is also "prior" art. The related art may or may not be prior art. The discussion is to be read in this light, and not as an admission of prior art.

Hydraulic fracturing of a subterranean geological formation typically involves pumping a frac proppant into a well bore to targeted regions thereby creating "fractures" within the formation and releasing hydrocarbons. The frac proppant generally includes a granular material such as a sand having certain characteristics. Such a sand is generally referred to as "frac sand". Frac proppant is typically mixed with water and other fracturing fluids using a mixing device (e.g., a blender) prior to pumping it into the well bore.

Typically, frac sand is transported to a well site by truck and/or rail car since the well site can be a significant distance away from the source of the frac sand. However, because large volumes of frac sand and water must be continuously provided to the well site by trucks and/or rail, traffic issues can arise, which can interrupt the supply of either the water or frac sand. If the supply of either the water or frac sand is disrupted, it can result in the inefficient use of the well drilling equipment. Additionally, the costs of a drilling operation can significantly increase if well drilling equipment is shut down because of the lack of supply of either sand or water. Still further, transporting adequate amounts of water to mix with the frac sand to the well site can add significant costs to a drilling operation.

One of the parameters of frac sand that is often closely monitored when using it in a well drilling operation is its water content. By limiting the water content of the frac sand, damage to frac sand processing and conveying equipment can be prevented or reduced. For example, in a typical drilling operation using frac sand, frac sand is pneumatically or otherwise conveyed from a source point to one or more augers configured to deliver the frac sand at a predetermined rate to a blender that mixes the frac sand with water and fracturing fluids in certain pre-determined amounts. However, if the frac sand contains excessive water when it is delivered to the one or more augers, the one or more augers can become damaged resulting in significant costs and time delays. Limiting the water content of frac sand can also provide other advantages. For example, the amounts of frac sand, water, and fracturing fluids are often carefully selected based on, among other things, the characteristics of the subterranean geological formation. By limiting the water content to predetermined levels upstream of the blender, the content of the fluids injected into the well bore can be accurately determined and monitored.

As a result of the above and other factors, frac sand is typically processed and stored so that it contains less than about 1 wt. % of water (generally referred to as "dry frac sand"). Dry frac sand can be processed using drying equipment (e.g., commercially available rotary sand dryers) and then stored at the well site in one or more specialized enclosed containers designed to prevent or reduce the amount of water content in the frac sand. However, specialized containers and equipment, and/or additional processing steps (e.g., drying steps) are often needed to maintain or reduce the water content of the frac sand, which can add significant time and cost to the well drilling operation.

Using dry frac sand in a well drilling operation can have other disadvantages. For example, the Occupational Safety and Health Administration (OSHA) and National Institute for Occupational Safety and Health (NIOSH) have recently identified exposure to airborne silica as a health hazard to workers conducting some hydraulic fracturing operations. Thus, to reduce or eliminate worker exposure to silica, specialized handling and conveyance equipment, and personal protective equipment (PPE) is often used at well drilling sites utilizing dry frac sand in drilling operations. Such equipment is often expensive and can add significant additional cost to the operation.

Contained herein is a disclosure directed to resolving, or at least reducing, one or more of the problems mentioned above, or other problems that may exist in the art.

NON-LIMITING BRIEF SUMMARY OF THE INVENTION

The present disclosure relates to systems and methods for conveying non-dry frac proppant. An aspect of the invention provides a system comprising at least one hopper defining an inlet and an outlet, the at least one hopper comprising at least one moisture sensor configured to measure and transmit a signal indicative of a water content of the non-dry frac proppant within the at least one hopper, and a slide gate that is fluidly connected to the at least one hopper. The system further comprises a conveyor assembly comprising at least one conveyor belt configured to convey the non-dry frac proppant from the at least one hopper to a blender, and at least one load sensor to measure and transmit a signal indicative of a mass of the frac proppant on the conveyor belt assembly. The system further comprises a control device configured to (i) regulate a discharge rate of the non-dry frac proppant from the outlet of the at least one hopper to the conveyor assembly, based on the signal from the at least one moisture sensor, and (ii) regulate a load rate of the non-dry frac proppant from the conveyor assembly to a blender, based on the signal from the at least one load sensor.

One or more aspects of the invention include the system of the preceding paragraph wherein the moisture sensor is configured to measure the water content in the non-dry frac proppant within about +/−1 wt. %.

One or more aspects of the invention include the system of any preceding paragraph wherein if the at least one moisture sensor measures a water content of less than about 5 wt. %, then the control device produces and transmits an alert signal.

One or more aspects of the invention include the system of any preceding paragraph where if the at least one moisture sensor measures a water content of greater than about 40 wt. %, then the control device produces and transmits an alert signal.

Another aspect of the invention provides a method comprising providing a system according to any preceding paragraph at a well site, conveying a non-dry frac proppant from a source point to the at least one hopper, measuring a content of water in the non-dry frac proppant within the at least one hopper using the at least one moisture sensor, conveying the non-dry frac proppant from the at least one hopper to the conveyor assembly at a discharge rate determined by the control device based on signal from the at least one moisture sensor; measuring a mass of the non-dry frac proppant on the conveyor assembly using the at least one load sensor, and conveying the non-dry frac proppant from the conveyor assembly to the blender at a load rate determined by the control device based on the signal from the at least one load sensor.

One or more aspects of the invention include the method of the preceding paragraph further comprising generating an alert signal from the control device if the at least one moisture sensor measures a water content of the non-dry frac proppant of less than about 5 wt. %.

One or more aspects of the invention include the method of any preceding paragraph further comprising generating an alert signal from the control device if the at least one moisture sensor measures a water content of the non-dry frac proppant of greater than about 40 wt. %

One or more aspects of the invention include the method of any preceding paragraph wherein the non-dry frac proppant comprises frac sand with at least the following properties: a sphericity value of 0.6 or greater, a roundness value of 0.6 or greater, and a water content of at least about 2 wt. %, more preferably in the range of about 5 wt. % to about 40 wt. %, and still more preferably in the range of about 5 wt. % to about 20 wt. %.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

BRIEF DESCRIPTION OF THE SEVERAL VIEWS OF THE DRAWINGS

The claimed subject matter may be understood by reference to the following description taken in conjunction with the accompanying figures, in which like reference numerals identify like elements, and in which:

The accompanying drawings illustrate specific embodiments. However, it is to be understood that these embodiments are not intended to be exhaustive, nor limiting of the disclosure. These specific embodiments are but examples of some of the forms in which the disclosure may be practiced. Like reference numbers or symbols employed across the several figures are employed to refer to like parts or components illustrated therein.

DETAILED DESCRIPTION

Disclosed herein are systems and methods for conveying non-dry frac proppant.

1. Definition(s)

"Dry frac proppant" means a frac proppant having a water content of less than about 1 wt. %. "Non-dry frac proppant" means a frac proppant having a water content of at least about 2 wt. %, more preferably in the range of about 5 wt. % to about 40 wt. %, and still more preferably in the range of about 5 wt. % to about 20 wt. %.

2. System(s) for Conveying a Non-Dry Frac Proppant

An aspect of the invention provides a system 100 that is configured to convey a non-dry frac proppant to a target location at a well site. The non-dry frac proppant comprises frac sand with at least the following properties: a sphericity value of 0.6 or greater, a roundness value of 0.6 or greater, and a water content of at least about 2 wt. %, more preferably in the range of about 5 wt. % to about 40 wt. %, and still more preferably in the range of about 5 wt. % to about 20 wt. %. As an example, the system 100 can be used to convey a non-dry frac proppant from a storage area at a well site to pumping equipment, such as a blender and/or a pump, so that the non-dry frac proppant can be pumped into a subterranean geological formation for hydraulic fracturing of the formation.

The system 100 comprises at least one hopper 110, a conveyor assembly 120, and a control device 130. The at least one hopper 110 is supported by an exterior frame 111. The exterior frame 111 provides structural support for the at least one hopper 110, and generally surrounds the at least one hopper 110. In an embodiment, the exterior frame 111 comprises a plurality of vertical supports 112 and horizontal supports 113 so as to form a cage surrounded the at least one hopper 110.

The at least one hopper 110 defines an inlet 114 and an outlet 115. The inlet 114 is formed adjacent to the top of the at least one hopper 110, and the outlet 115 is formed adjacent to the bottom of the at least one hopper 110. The at least one hopper 110 further comprises a slide gate 116 that is fluidly connected to the outlet of the at least one hopper 110. The slide gate 116 is movable between a closed position and an open position to allow conveyance of the non-dry frac proppant from the at least one hopper 110. In an embodiment, the slide gate 116 comprises a plate sized to cover the outlet of the at least one hopper 110, and a pin connected to an actuator that is affixed to the slide gate 116. The pin and actuator configuration permits movement of the slide gate 116 between the closed position and the open position.

At least one moisture sensor 117 is present within the at least one hopper 110, for example, the at least one moisture sensor 117 can be positioned on an inner side wall of the at least one hopper 110. The at least one moisture sensor 117 is configured to measure and transmit a signal indicative of a water content of the non-dry frac proppant within the at least one hopper 110. The at least one moisture sensor 117 is capable of measuring measure the water content in the non-dry frac proppant within about +/−1 wt. %.

Figure 2:
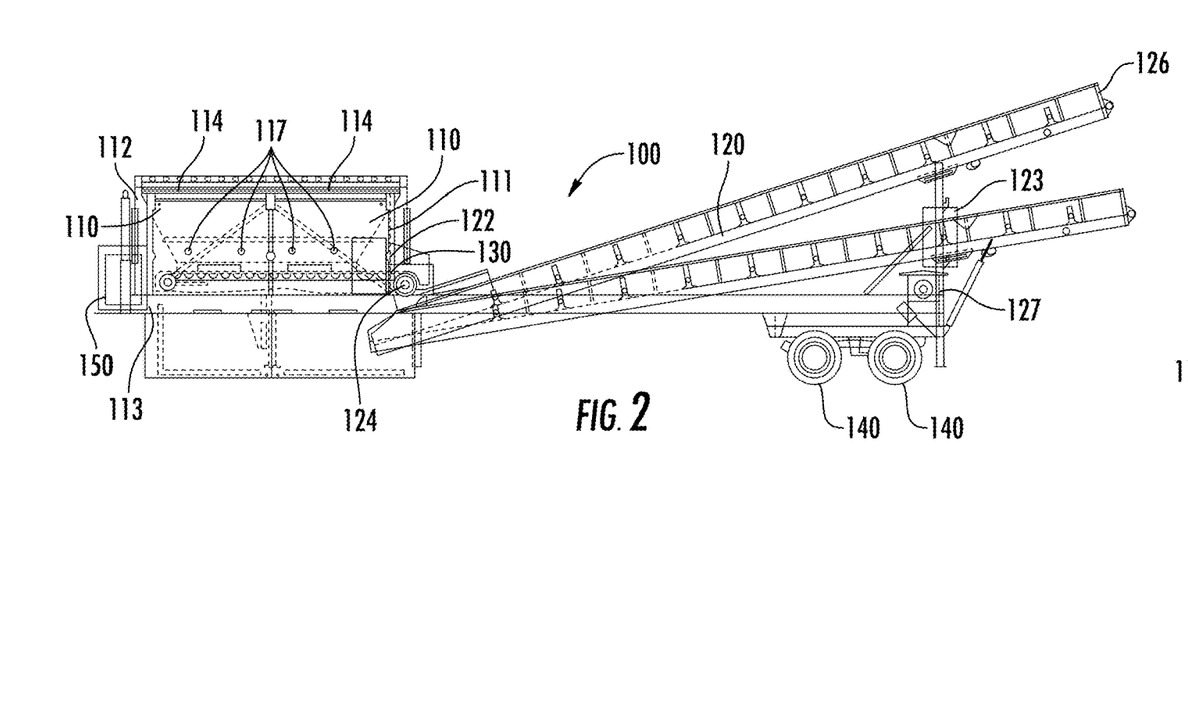
FIG. 2 illustrates a side view of FIG. 1.
Figure 3:
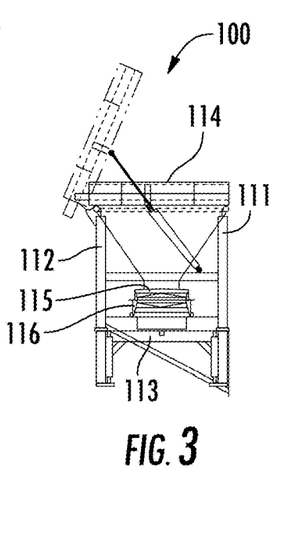
FIG. 3 illustrates a front view of FIG. 1.
Figure 4:
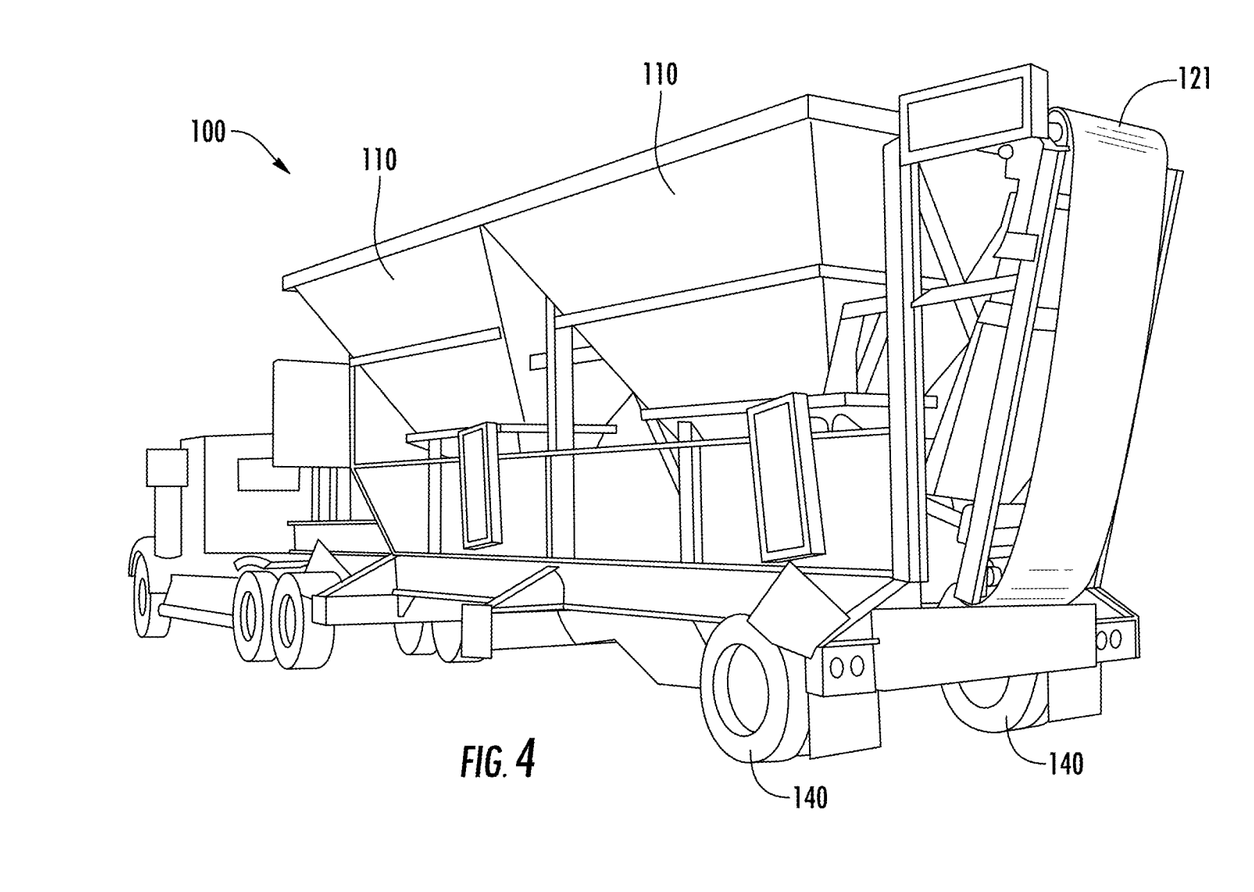
FIG. 4 illustrates a system in accordance with this disclosure being transported by a vehicle.
Figure 5:
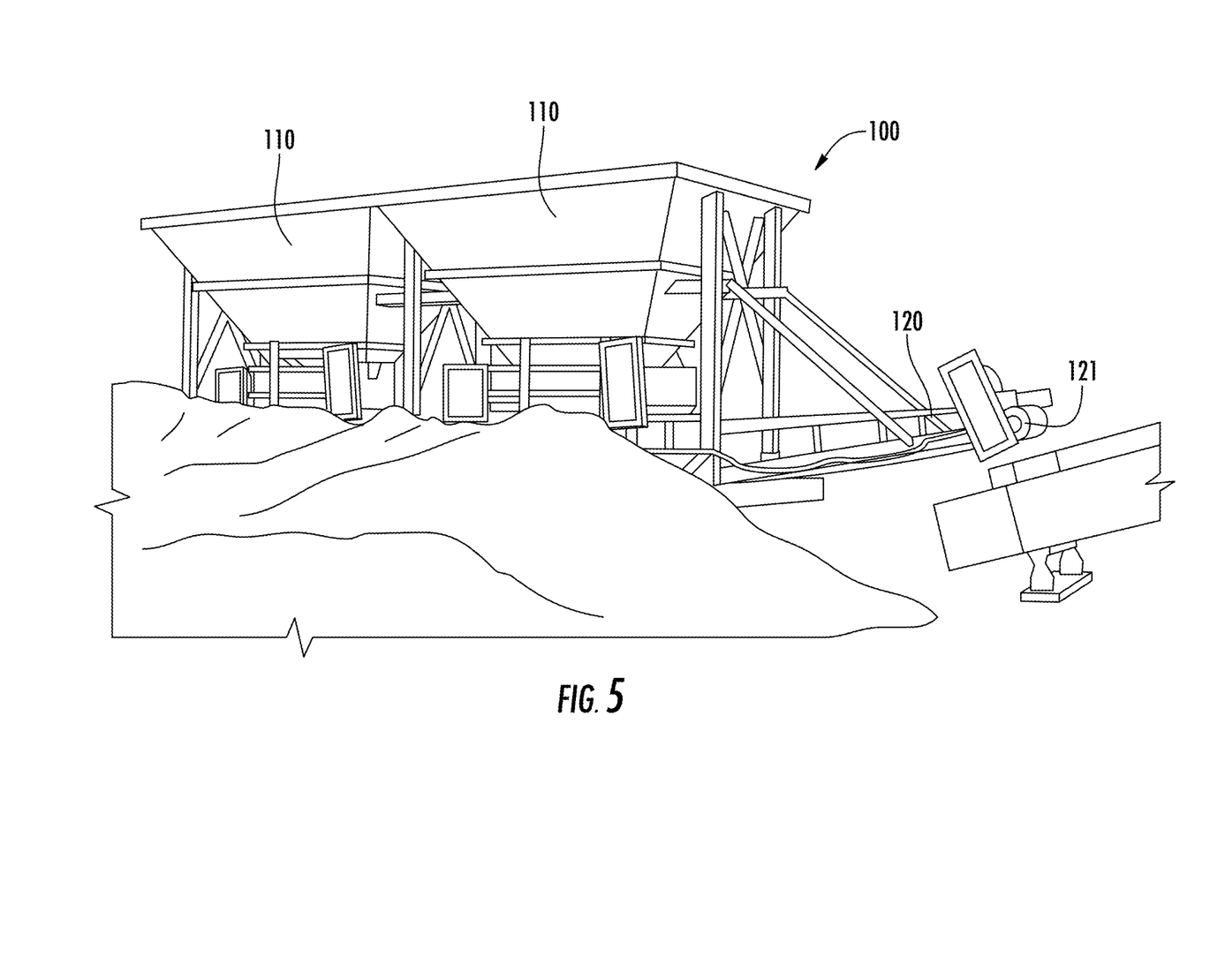
FIG. 5 illustrates a system in accordance with this disclosure at a well site.
Figure 6:
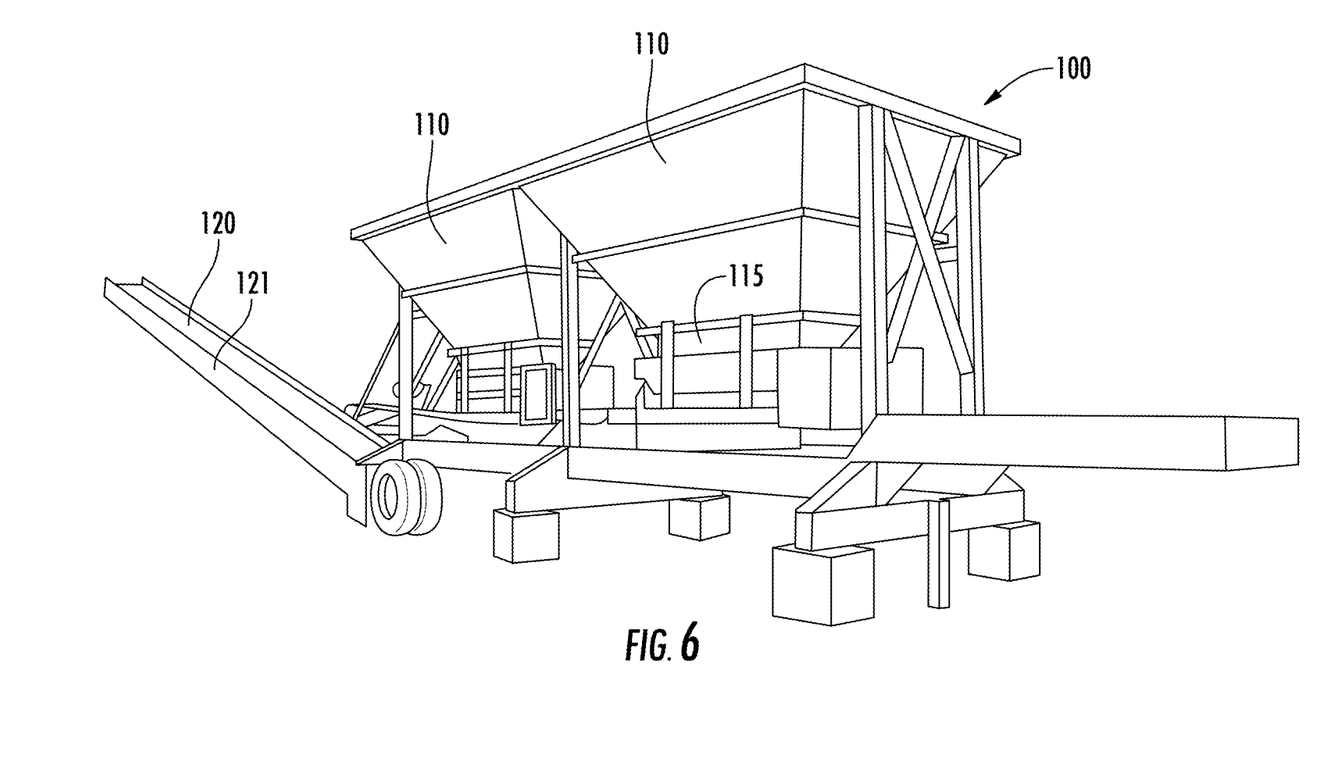
FIG. 6 illustrates a system in accordance with this disclosure at a well site.
Figure 7:
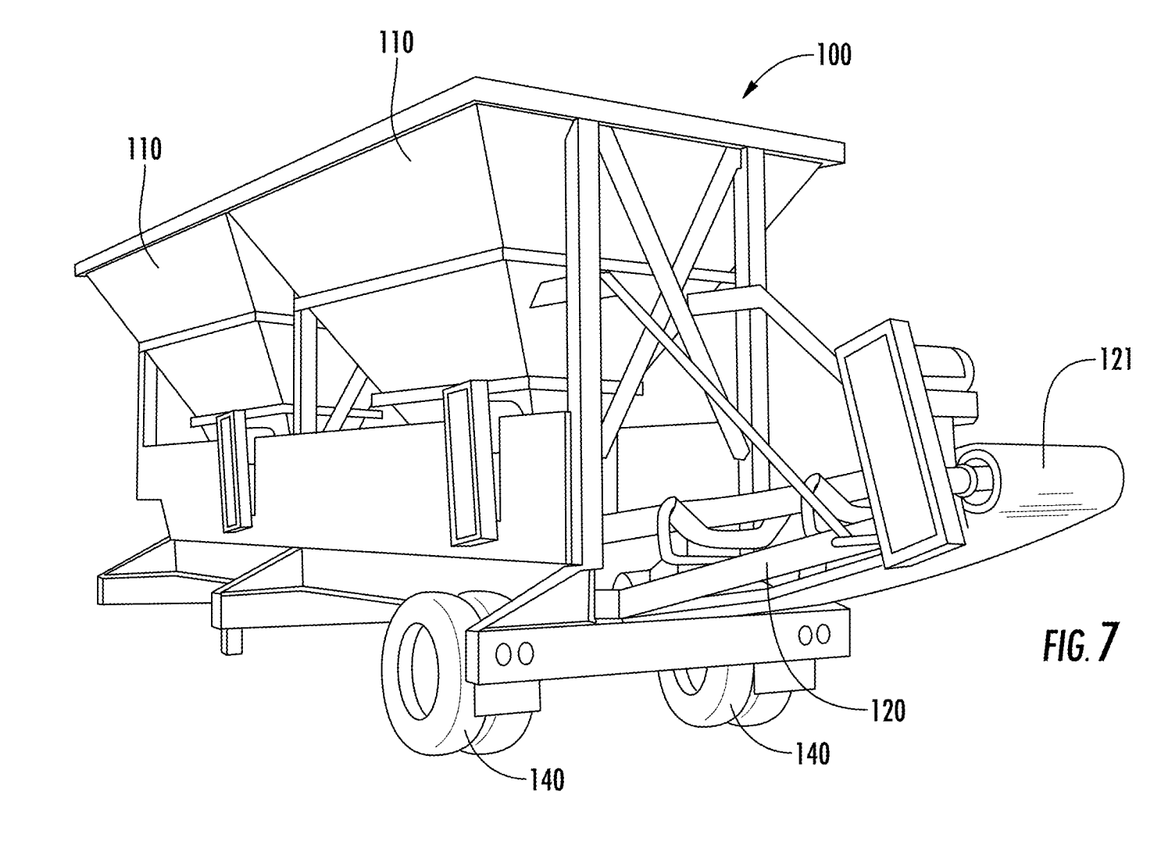
FIG. 7 illustrates a system in accordance with this disclosure at a well site.
Figure 8:
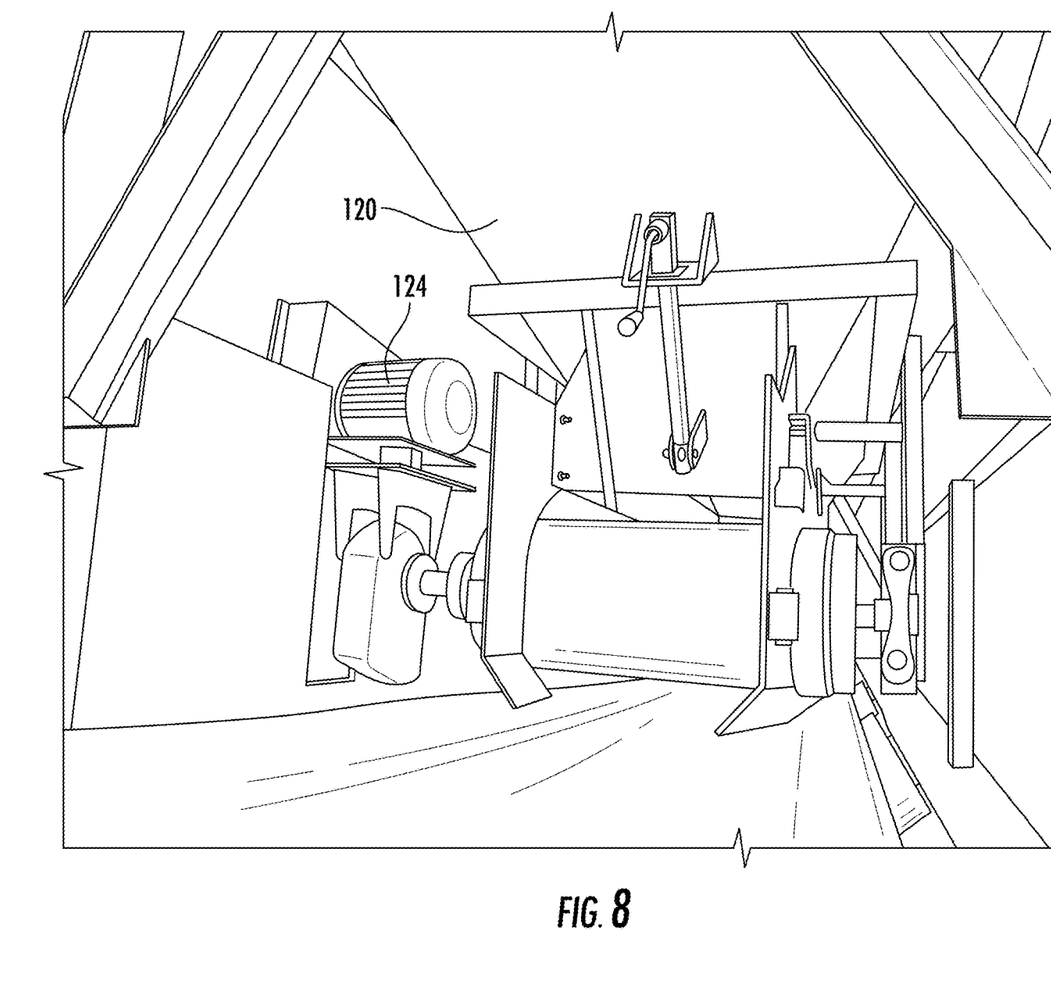
FIG. 8 illustrates a gearbox and a drive for a system in accordance with this disclosure.

The conveyor assembly 120 comprises at least one conveyor belt 121 configured to convey the non-dry frac proppant from the at least one hopper 110 to a target location such as one or more blenders. The conveyor belt 121 is operated by a gearbox 124, which is affixed to the system as shown in FIG. 2. The gearbox 124 is driven by a motor having a shaft 125 which provides the motive force to move the conveyor belt 121. The conveyor assembly 120 is affixed to the exterior frame 111 at a first end 122 so as to allow positioning of the conveyor assembly 120 below the slide gate 116 of the at least one hopper 110. In this manner, the conveyor assembly 120 receives non-dry frac proppant discharged from the outlet 115 of the at least one hopper 110.

The conveyor assembly 120 further comprises at least one load sensor 123 positioned on the conveyor assembly 120 so as to measure the mass of the non-dry frac proppant on the at least one conveyor belt 121. The at least one load sensor 123 is configured to measure and transmit a signal indicative of a mass of the frac proppant that is on the conveyor belt assembly 120 during conveyance to the target location.

The conveyor assembly 120 can further comprise a discharge chute affixed to its second end so as to discharge the non-dry frac proppant from the conveyor belt 121 to the target location. As illustrated in FIG. 2, the conveyor assembly can further comprise an elevation control mechanism 127 that enables vertical movement of the conveyor assembly 120 to a desired elevation.

The control device 130 is configured to receive one or more signals from one or more sensors and transmits signals to one or more devices or systems. In an embodiment, the control device 130 receives one or more signals from the at least one moisture sensor and is configured to regulate a discharge rate of the non-dry frac proppant from the outlet 115 of the at least one hopper 110 to the conveyor assembly 120, based on the one or more signals from the at least one moisture sensor 117. In an embodiment, the control device 130 is configured to transmit a signal to an actuator to move the slide gate 116 into the open position or closed position, based on the signal from the at least one moisture sensor 117, thereby regulating the discharge rate of the non-dry frac proppant from the outlet 115 of the at least one hopper 110 to the conveyor assembly 120. For example, if the at least moisture sensor 117 measures a water content of less than a predetermined amount such as about 5 wt. %, then the control device 130 can send a signal to the actuator to move the slide gate 116 into the closed position to allow for addition of water to the material including the non-dry frac proppant in the at least one hopper 110 and/or source point to achieve a desired level of water in the material including the non-dry frac proppant. Alternatively, if the at least moisture sensor 117 measures a water content of greater than a predetermined amount such as about 40 wt. %, then the control device 130 can send a signal to the actuator to move the slide gate 116 into the closed position to allow removal of water from the material including the non-dry frac proppant in the at least one hopper 110 and/or source point to achieve a desired level of water in the material, for example, through use of a dryer or other drying operation. It should be appreciated that the predetermined amount of water content in the non-dry frac sand can vary based on the requirements of the drilling operations, but it should be at least about 2 wt. %, more preferably in the range of about 5 wt. % to about 40 wt. %, and still more preferably in the range of about 5 wt. % to about 20 wt. %.

The control device 130 is further configured to regulate a load rate of the non-dry frac proppant from the conveyor assembly 120 to target location (e.g., a blender upstream of a pump), based on the signal from the at least one load sensor 123. In an embodiment, the control device 130 (e.g., a manually operated or programmable controller) is configured to transmit a signal to the motor to increase or decrease the speed of its shaft 125, which provides motive force to move the conveyor belt 121 of the conveyor assembly 120. For example, if the at least one load sensor 123 detects that the mass of material transported on the conveyor belt 121 is above a desired level, then the control device 130 can transmit a signal to the motor to decrease the speed of its shaft 125 thereby slowing the speed of the conveyor belt 121 or stopping the conveyor belt 121 altogether. Similarly, if the at least one load sensor 123 detects that the mass of material transported on the conveyor belt 121 is below a desired level, then the control device 130 can transmit a signal to the motor to increase the speed of its shaft 125 so as to hasten the speed of the conveyor belt 121. In this manner, the control device 130 can ensure that the desired amount of material including non-dry frac proppant is conveyed to the target location.

The control device 130 can also be connected to a display to permit a notification to be displayed on a screen when the at least one moisture sensor 117 measures a water content of the material within the at least one hopper 110 that is above or below a desired level. For example, in an embodiment, the control device 130 is in the form of a handheld computing device having a display screen. In this manner, the control device 130 can ensure that the material conveyed to the target location by the system 110 is non-dry frac proppant.

The control device 130 can also be configured to transmit one or more signals based on the one or more signal received from the one or more sensors to a monitoring center or other device such as a handheld computing device. The monitoring center or other device can process the signals and take action such as adding additional water or chemicals. Alternatively, the monitoring center or other device can process the signals and provide a notification to a user so that the user can manually intervene to add water or chemicals to the non-dry frac proppant as needed.

Figure 1:
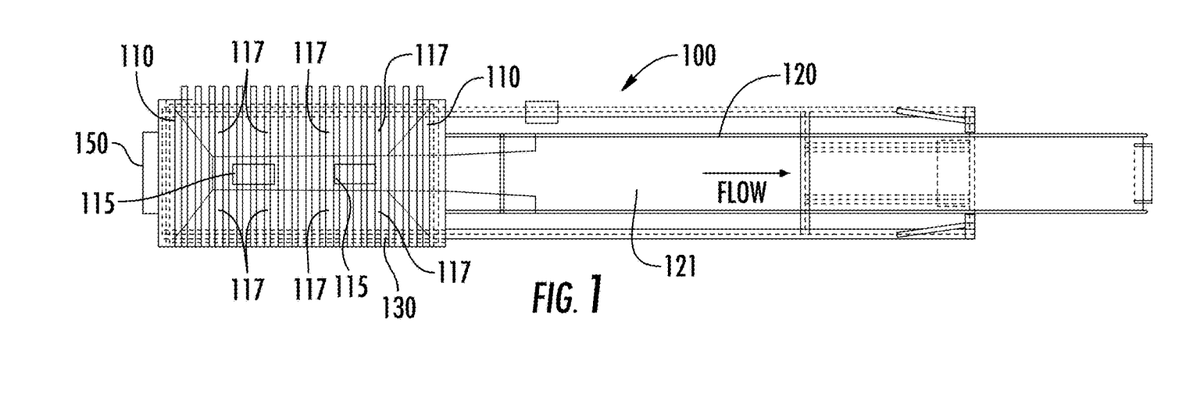
FIG. 1 illustrates a plan view of an embodiment of a system in accordance with this disclosure.

It should be appreciated that depending on the requirements of the hydraulic fracturing operation (e.g., the amount of non-dry frac proppant needed for the hydraulic fracturing operation), the system can comprise a plurality of hoppers 110. For example, as shown in FIG. 1, the system 100 comprises at least two hoppers 110. Similarly, each hopper 100 can comprise a plurality of moisture sensors 117 located within each hopper 100. For example, as shown in FIG. 1 each hopper 110 comprises at least four moisture sensors 117. In embodiments with multiple hoppers, each hopper 100 can be configured as described herein.

The system 100 can be configured so as to allow the system to be transported by a vehicle to a desired location, such as a location at a well site. For example, as shown in FIG. 2, one or more wheels 140 can be affixed to the conveyor assembly 120, for example, at the second end 126 of the conveyor assembly 120 to allow the system 100 to be in the form of a trailer capable of being transported by a truck.

The system can further comprise a generator for generating electricity to power the system as illustrated at 150.

In one or more embodiments, depending on the requirements of the subterranean geological formation, conditions at the well site, and characteristics of the non-dry frac proppant, the system 100 can further comprise additional processing equipment, for example, a dryer, dewatering screen, a blender, a pump and so forth.

3. Method(s) for Conveying a Non-Dry Frac Proppant

In operation, the system 100 as described herein is provided at a well site. A non-dry frac proppant from a source point (e.g., a storage building, storage container, storage pile, truck, rail car) is loaded into the inlet 114 of the at least one hopper 110. The at least one moisture sensor 117 measures a content of water in the non-dry frac proppant within the at least one hopper 110 and transmits a signal indicative of the measured water content of the non-dry frac proppant to a control device 130. The system 100 conveys the non-dry frac proppant from the outlet 115 of the at least one hopper 110 to the conveyor assembly at a discharge rate determined by the control device 130 based on signal from the at least one moisture sensor 117. The at least one load sensor 123 measures a mass of the non-dry frac proppant on the conveyor belt 121 of the conveyor assembly 120. The system 100 conveys the non-dry frac proppant from the conveyor assembly 120 to a target location, such as a blender, at a load rate determined by the control device 130 based on the signal from the at least one load sensor.

In one or more embodiments, the method can further comprise generating an alert signal from the control device 130 if the at least one moisture sensor 117 measures a water content of the non-dry frac proppant of less than a predetermined amount such as about 5 wt. %. The method can further comprise generating an alert signal from the control device 130 if the at least one moisture sensor 117 measures a water content of the non-dry frac proppant of greater than a predetermined amount such as about 40 wt. %, more preferably about 20 wt. %.

It should be recognized that unless stated otherwise, it is intended that endpoints are to be interchangeable. Further, any ranges include iterative ranges of like magnitude falling within the expressly stated ranges or limitations disclosed herein is to be understood to set forth every number and range encompassed within the broader range of values. It is to be noted that the terms "range" and "ranging" as used herein generally refer to a value within a specified range and encompasses all values within that entire specified range.

Except as may be expressly otherwise indicated, the article "a" or "an" if and as used herein is not intended to limit, and should not be construed as limiting, a claim to a single element to which the article refers. Rather, the article "a" or "an" if and as used herein is intended to cover one or more such elements, unless the text taken in context clearly indicates otherwise.

Each and every patent or other publication or published document referred to in any portion of this specification is incorporated as a whole into this disclosure by reference, as if fully set forth herein.

This invention is susceptible to considerable variation in its practice. The particular illustrative examples which are described with particularity in this specification are not intended to limit the scope of the invention. Rather, the examples are intended as concrete illustrations of various features and advantages of the invention, and should not be construed as an exhaustive compilation of each and every possible permutation or combination of materials, components, configurations or steps one might contemplate, having the benefit of this disclosure. Similarly, in the interest of clarity, not all features of an actual implementation of an apparatus, system or related methods of use are described in this specification. It of course will be appreciated that in the development of such an actual implementation, numerous implementation-specific decisions must be made to achieve the developers' specific goals, such as compliance with system-related and economic-related constraints, which may vary from one implementation to another. Moreover, it will be appreciated that while such a development effort might be complex and time-consuming, it would nevertheless be a routine undertaking for those of ordinary skill in the art having the benefit of this disclosure. Therefore, the above description is not intended to limit, and should not be construed as limiting, the invention to the particular exemplifications presented hereinabove.

Further, the subject matter is described above with reference to numerous aspects and specific examples. Many variations will suggest themselves to those skilled in the art in light of the above detailed description. All such obvious variations are within the full intended scope of the appended claims. Other aspects of the subject matter disclosed herein can include, but are not limited to, the following (aspects are described as "comprising" but, alternatively, can "consist essentially of", or "consist of"):

Aspect 1. A system for conveying a non-dry frac proppant to a target location at a well site, the system comprising:
  at least one hopper defining an inlet and an outlet, the at least one hopper comprising at least one moisture sensor configured to measure and transmit a signal indicative of a water content of the non-dry frac proppant within the at least one hopper, and a slide gate that is fluidly connected to the at least one hopper;
  a conveyor assembly comprising at least one conveyor belt configured to convey the non-dry frac proppant from the at least one hopper to a blender, and at least one load sensor to measure and transmit a signal indicative of a mass of the frac proppant on the conveyor belt assembly; and
  a control device configured to (i) regulate a discharge rate of the non-dry frac proppant from the outlet of the at least one hopper to the conveyor assembly, based on the signal from the at least one moisture sensor, and (ii) regulate a load rate of the non-dry frac proppant from the conveyor assembly to a blender, based on the signal from the at least one load sensor.

Aspect 2. The system defined in Aspect 1, wherein the at least one moisture sensor is configured to measure the water content in the non-dry frac proppant within about +/−1 wt. %.

Aspect 3. The system defined in any of Aspects 1-2, wherein if the at least moisture sensor measures a water content of less than about 5 wt. %, then the control device produces and transmits an alert signal.

Aspect 4. The system defined in any of Aspects 1-3, wherein if the at least moisture sensor measures a water content of greater than about 40 wt. %, then the control device produces and transmits an alert signal.

Aspect 5. A method for conveying a non-dry frac proppant to a target location at a well site, the method comprising:
  providing a system according to claim 1 at a well site;
  conveying a non-dry frac proppant from a source point to the at least one hopper;

measuring a content of water in the non-dry frac proppant within the at least one hopper using the at least one moisture sensor;
conveying the non-dry frac proppant from the at least one hopper to the conveyor assembly at a discharge rate determined by the control device based on signal from the at least one moisture sensor;
measuring a mass of the non-dry frac proppant on the conveyor assembly using the at least one load sensor; and
conveying the non-dry frac proppant from the conveyor assembly to the blender at a load rate determined by the control device based on the signal from the at least one load sensor.

Aspect 6. The method defined by Aspect 5 further comprising generating an alert signal from the control device if the at least one moisture sensor measures a water content of the non-dry frac proppant of less than about 5 wt. %.

Aspect 7. The method defined by any of Aspects 5-6 further comprising generating an alert signal from the control device if the at least one moisture sensor measures a water content of the non-dry frac proppant of greater than about 40 wt. %

Aspect 8. The method defined by any of Aspects 5-7, wherein the non-dry frac proppant comprises frac sand with at least the following properties: a sphericity value of 0.6 or greater, a roundness value of 0.6 or greater, and a water content in the range from about 5 wt. % to about 20 wt. %.

Aspect 9. The method defined by any of Aspects 5-8, wherein the non-dry frac proppant comprises frac sand with at least the following properties: a sphericity value of 0.6 or greater, a roundness value of 0.6 or greater, and a water content of at least about 2 wt. %.

What is claimed is:

1. A system for conveying a non-dry frac proppant to a target location at a well site, the system comprising:
    at least one hopper defining an inlet and an outlet, the at least one hopper comprising at least one moisture sensor configured to measure and transmit a signal indicative of a water content of the non-dry frac proppant within the at least one hopper, and a slide gate that is fluidly connected to the at least one hopper;
    a conveyor assembly comprising at least one conveyor belt configured to convey the non-dry frac proppant from the at least one hopper to a blender, and at least one load sensor to measure and transmit a signal indicative of a mass of the frac proppant on the conveyor belt assembly; and
    a control device configured to (i) regulate a discharge rate of the non-dry frac proppant from the outlet of the at least one hopper to the conveyor assembly, based on the signal from the at least one moisture sensor, and (ii) regulate a load rate of the non-dry frac proppant from the conveyor assembly to a blender, by adjusting the conveyor assembly belt speed based on the signal from the at least one load sensor.

2. The system of claim 1, wherein the at least one moisture sensor is configured to measure the water content in the non-dry frac proppant within about +1-1 wt. %.

3. The system of claim 1, wherein if the at least one moisture sensor measures a water content of less than about 5 wt. %, then the control device produces and transmits an alert signal.

4. The system of claim 1, wherein if the at least one moisture sensor measures a water content of greater than about 40 wt. %, then the control device produces and transmits an alert signal.

5. A method for conveying a non-dry frac proppant to a target location at a well site comprising:
    providing a system according to claim 1 at a well site;
    conveying a non-dry frac proppant from a source point to the at least one hopper;
    measuring a content of water in the non-dry frac proppant within the at least one hopper using the at least one moisture sensor;
    conveying the non-dry frac proppant from the at least one hopper to the conveyor assembly at a discharge rate determined by the control device based on signal from the at least one moisture sensor;
    measuring a mass of the non-dry frac proppant on the conveyor assembly using the at least one load sensor; and
    conveying the non-dry frac proppant from the conveyor assembly to the blender at a load rate determined by the control device so as to adjust the conveyor assembly belt speed based on the signal from the at least one load sensor.

6. The method of claim 5 further comprising generating an alert signal from the control device if the at least one moisture sensor measures a water content of the non-dry frac proppant of less than about 5 wt. %.

7. The method of claim 5 further comprising generating an alert signal from the control device if the at least one moisture sensor measures a water content of the non-dry frac proppant of greater than about 40 wt. %.

8. The method of claim 5 wherein the non-dry frac proppant comprises frac sand with at least the following properties: a sphericity value of 0.6 or greater, a roundness value of 0.6 or greater, and a water content in the range from about 5 wt. % to about 20 wt. %.

9. The method of claim 5 wherein the non-dry frac proppant comprises frac sand with at least the following properties: a sphericity value of 0.6 or greater, a roundness value of 0.6 or greater, and a water content of at least about 2 wt. %.

10. A method for conveying a non-dry frac proppant to a target location at a well site comprising:
    providing a system according to claim 1 at a well site;
    conveying a non-dry frac proppant from a source point to the at least one hopper;
    measuring a content of water in the non-dry frac proppant within the at least one hopper using the at least one moisture sensor;
    conveying the non-dry frac proppant from the at least one hopper to the conveyor assembly at a discharge rate determined by the control device based on signal from the at least one moisture sensor;
    measuring a mass of the non-dry frac proppant on the conveyor assembly using the at least one load sensor; and
    conveying the non-dry frac proppant from the conveyor assembly to the blender at a load rate determined by the control device based on the signal from the at least one load sensor;
    wherein the non-dry frac proppant comprises frac sand with at least the following properties: a sphericity value of 0.6 or greater, a roundness value of 0.6 or greater, and a water content in the range from about 5 wt. % to about 20 wt. %.

11. A method for conveying a non-dry frac proppant to a target location at a well site comprising:
    providing a system according to claim 1 at a well site;
    conveying a non-dry frac proppant from a source point to the at least one hopper;

measuring a content of water in the non-dry frac proppant within the at least one hopper using the at least one moisture sensor;

conveying the non-dry frac proppant from the at least one hopper to the conveyor assembly at a discharge rate determined by the control device based on signal from the at least one moisture sensor;

measuring a mass of the non-dry frac proppant on the conveyor assembly using the at least one load sensor; and conveying the non-dry frac proppant from the conveyor assembly to the blender at a load rate determined by the control device based on the signal from the at least one load sensor;

wherein the non-dry frac proppant comprises frac sand with at least the following properties: a sphericity value of 0.6 or greater, a roundness value of 0.6 or greater, and a water content of at least about 2 wt. %.

* * * * *

UNITED STATES PATENT AND TRADEMARK OFFICE
CERTIFICATE OF CORRECTION

PATENT NO.         : 11,643,287 B2
APPLICATION NO.    : 16/190315
DATED              : May 9, 2023
INVENTOR(S)        : Richard F. Dawson, William J. Walker and Robert D. Harper It is certified that error appears in the above-identified patent and that said Letters Patent is hereby corrected as shown below:

In the Claims

Column 9, Line 59, Claim 2, the end of the sentence reads "about +1-1 wt. %." and should read ---about +/- 1 wt.%.---

Signed and Sealed this
Twenty-ninth Day of August, 2023

Katherine Kelly Vidal
Director of the United States Patent and Trademark Office